United States Patent [19]
Bishop

[11] Patent Number: 5,093,551
[45] Date of Patent: Mar. 3, 1992

[54] OPTICALLY PUMPED LASER

[75] Inventor: Donald Bishop, Greenwood, Ind.

[73] Assignee: Electrox, Inc., Indianapolis, Ind.

[21] Appl. No.: 618,168

[22] Filed: Nov. 26, 1990

Related U.S. Application Data

[62] Division of Ser. No. 367,286, Jun. 15, 1989.

[51] Int. Cl.⁵ ............................................. B23K 26/00
[52] U.S. Cl. .......................... 219/121.72; 219/121.61
[58] Field of Search ..................... 219/121.72, 121.61, 219/121.62, 121.67

[56] References Cited
U.S. PATENT DOCUMENTS 4,356,376 10/1982 Komanduri et al. ............ 219/121.72

Primary Examiner—C. L. Albritton
Attorney, Agent, or Firm—Lahive & Cockfield

[57] ABSTRACT

An improved optically pumped NdYAG laser amplifier is provided having high average power and high pulse repetition rates with improved energy conversion efficiency. The amplifier employs a coating on the pump cavity surface which is highly reflective of light as the pumping wavelength and samarium coated flow tubes surrounding the flash lamps to enhance transmission of pumping wavelengths. A system of two amplifiers is described for metal cutting application including cutting of aerospace metals without discoloration of the metal at the edge of the cut.

3 Claims, 2 Drawing Sheets

OPTICALLY PUMPED LASER

This is a division of application Ser. No. 367,286, filed on June 15, 1989.

BACKGROUND OF THE INVENTION

This invention relates to optically pumped lasers and particularly NdYAG lasers for industrial applications providing high average power in pulsed operation.

An average power of laser radiation of 1 kilowatt or more is desired for various industrial applications including welding or cutting of metals Gas discharge lasers, particularly using $CO_2$ as the lasing gas, have dominated these high average power applications. $CO_2$ lasers operate with a relatively high energy conversion efficiency of about 10% or more and, besides energy, have only the lasing gases as a normal operating consumable. Nevertheless, $CO_2$ lasers suffer the disadvantages of requiring large mechanical structures and producing radiation at 10.6 micron wavelength which is substantially reflected by most metals. As a consequence of this high reflectance, $CO_2$ lasers are unsuitable for cutting relatively thick sections of such metals as copper, aluminum, titanium and certain steels. In contrast to $CO_2$ lasers, optically pumped NdYAG lasers produce laser radiation at 1.06 micron wavelength which is absorbed by metals nearly an order of magnitude more than the radiation of the $CO_2$ laser. However, NdYAG lasers of known types operate at energy conversion efficiencies of about 2-3% and the pumping flash lamps have a predictable life determined by the energy applied. The flash lamps must therefore be considered as consumables when determining operating costs.

Further, the replacement of flash lamps in known lasers typically requires some disassembly of the laser head.

NdYAG lasers operating in pulsed mode may produce high peak powers desirable for processing metals while maintaining average power at substantially lower levels. However, known NdYAG lasers have not produced sufficient peak power at sufficient pulse repetition rates to cut thinner sections of metals as are used in aircraft at high enough speed to prevent discoloration associated with oxidation and stress of the material surrounding the cut. Therefore neither known $CO_2$ nor known NdYAG lasers have been accepted by aircraft manufacturers for cutting components for air frames. It is therefore desirable to achieve high average power operation with a NdYAG laser with high pulse repetition rates and at the same time extend the operating life of the laser flash lamps.

While a theoretical limit of average power for a NdYAG laser rod of commonly used dimensions is 900 watts, practical applications limit the operation to a maximum of about 400 watts average power. With typical operating efficiencies of less than 3%, the required power input for 400 watts average power operation is in excess of 16 kilowatts. To achieve a desired power level of near 1 kilowatt, multiple laser amplifiers and a power input in excess of 40 kilowatts would be required. Further, operation of flash lamps at the required high energy levels results in reduced operating life of the flash lamps, effectively increasing the overall operating costs.

In light of the limitations of known high power lasers for industrial application, it is an object of this invention to provide an optically pumped NdYAG laser for high average power operation, operating with substantially improved efficiency.

It is a further object of this invention to provide an optically pumped NdYAG laser for high average power operation providing increased flash lamp life over prior art devices for the same operating conditions.

It is a still further object of the present invention to provide an optically pumped NdYAG laser system providing average power in pulsed operation of at least 800 watts.

It is a still further object of the present invention to provide an optically pumped NdYAG laser system for high average power applications having operating costs which compare favorably with operating costs for $CO_2$ lasers for the same applications.

It is a still further object of the present invention to provide an optically pumped laser system for high average power applications including cutting relatively thick sections of metals.

It is a still further object of the present invention to provide an optically pumped laser system for high average power applications including cutting of thin sections of metals without discoloration at the periphery of the cut.

Further objects and advantages of the present invention shall become apparent from the attached drawings and descriptions thereof.

SUMMARY OF THE INVENTION

In accordance with the aforesaid objects, an optically pumped NdYAG laser is provided having an overall operating efficiency of about 4%. A laser amplifier is provided including a pump cavity block having an optical pumping cavity therethrough, end plates affixed to the block supporting a NdYAG rod and a plurality of flash lamps in functional spaced relationship within the cavity and a plurality of samarium coated glass tubes, each tube supported by the end plates to surround the portion of a flash lamp disposed within the cavity. The cavity surfaces are made highly reflective of the light at the pumping wave lengths. Means are provided for admitting and exhausting liquid coolant from the cavity and the interior of the tubes.

In another aspect of the invention, a laser system is provided including a single laser oscillator and at least one laser amplifier, both the laser oscillator and the laser amplifier including a laser head in accordance with the invention.

DESCRIPTION OF THE PREFERRED EMBODIMENTS

For purposes of illustrating the invention, a laser amplifier and laser system constituting preferred embodiments shall be described in detail. The preferred embodiments correspond to products available from International Laser Machines Corporation, the assignee of the present invention. It is to be understood that the preferred embodiments are illustrative only, and the description thereof is not intended to limit in any way the scope of the invention as defined by the appended claims.

Figure 1:
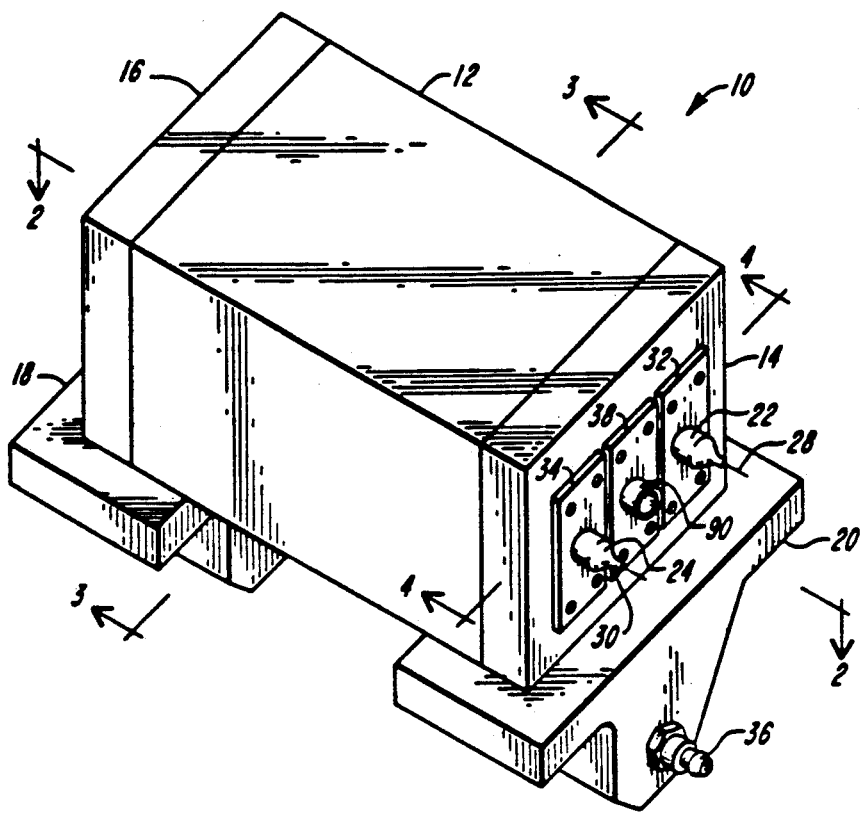
FIG. 1 is an isometric view of a laser head in accordance with the present invention.

Referring to FIG. 1, a laser amplifier or head assembly 10 is shown including a single piece, pump cavity block 12 with end plates 14 and 16 affixed thereto. Applicant has chosen beryllium copper as the material for fabrication of the block 12. The pump cavity block and end plate assembly is mounted on front manifold 20 and rear manifold 18. Flash lamps 22 and 24 as well as a NdYAG rod (not shown in FIG. 1) are supported by the end plates in a spaced relationship within a pump cavity in block 12. Applicant has chosen krypton gas discharge flash lamps having spectral peaks within the range of 750 to 900 microns and producing an intensity as a function of the discharge voltage and discharge current. These lamps have a typical energy conversion efficiency of approximately 80%. Terminals 28 and 30 for electrical connection to flash lamps 22 and 24 are external of the end plates 14 and 16 and pump cavity block 12. Seal plates 32 and 34 retain "O"-ring seals against the outside face of end plate 14 and surrounding the flash lamps 22 and 24 respectively. Similarly seal plate 38 retains an "O"-ring seal around the outside of a cylindrical rod holder 90 against end plate 14. Passages in end plate 14 communicate with passages in front manifold block 20 to admit liquid coolant for transferring heat from the flash lamps 22 and 24 and the NdYAG rod. The liquid coolant is admitted to front manifold 20 via the hose connection 36.

Figure 2:
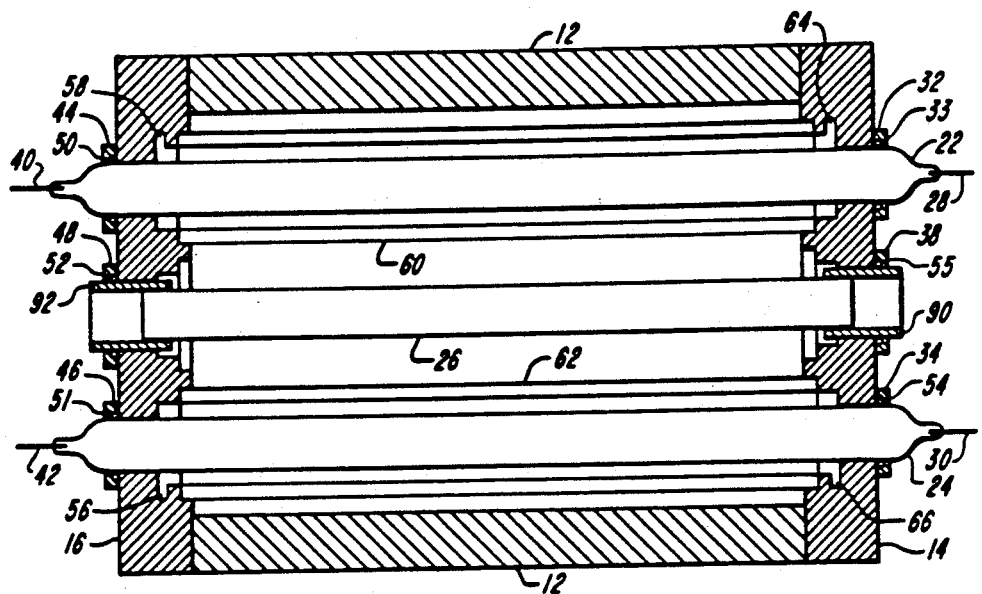
FIG. 2 is a sectional view taken through the plane indicated at 2—2 of FIG. 1.
Figure 4:
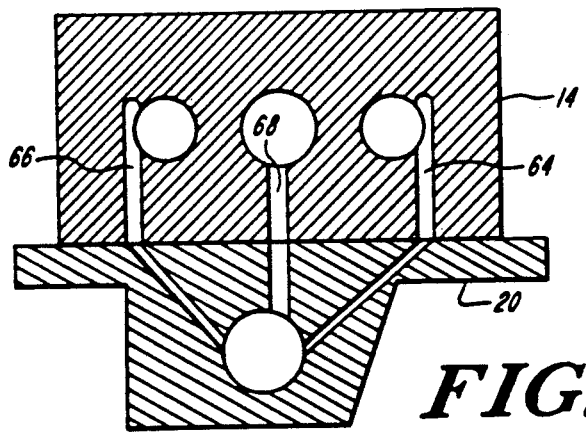
FIG. 4 is a sectional view taken through the plane indicated at 4—4 of FIG. 1.

Referring to FIG. 2, flow tubes 60 and 62 are shown supported in the end plates 14 and 16 and surrounding the flash lamps 22 and 24 respectively. Seal plates 44, 46 and 48 affixed to end plate 16 are shown retaining the "O"-rings 50, 51 and 52 respectively against the face of end plate 16 and surrounding flash lamps 22 and 24 and rod holder 92 respectively. Likewise, seal plates 32, 34 and 38 retain "O"-rings 53, 54 and 55 against end plate 14. NdYAG rod 26 is supported in end plates 16 and 14 by rod holders 92 and 90 respectively. The NdYAG rod is made of yttrium-aluminum-garnet with a concentration of neodymium doping of from about 0.9% to about 1.1% depending on the desired power output. The rod is of cylindrical shape, about 10 millimeters in diameter and about 150 millimeters in length. The use of the rod holders 90 and 92 permits the NdYAG rod 26 to be supported by the end plates without relegating a substantial portion of the rod to providing support outside the reflecting cavity. Terminals 40 and 42 of flash lamps 22 and 24 respectively are shown extending beyond end plate 16 for connection of power to the flash lamps. Passages 64 and 66 of end plate 14 admit liquid coolant to the recesses in end plate 14 communicating with the interior of the flow tubes 60 and 62 respectively. FIG. 4 shows the communication of the passages 64 and 66 of end plate 14 with connecting passages of front manifold 20. Liquid coolant such as, for example, deionized water, is conducted along the interior of the flow tubes 60 and 62 and is exhausted through passages 58 and 56 in end plate 16. An additional passage 68 (shown in FIG. 4) admits liquid coolant from end Plate 14 to the cavity surrounding the NdYAG rod 26 and the exterior of the flow tubes 60 and 62. This connecting passage 68, communicates with the recess surrounding the end of NdYAG rod 26 and the inlet passage of front manifold 20. A like arrangement is provided in end Plate 16 with rear manifold 18 to exhaust liquid coolant from the pump cavity.

Figure 3:
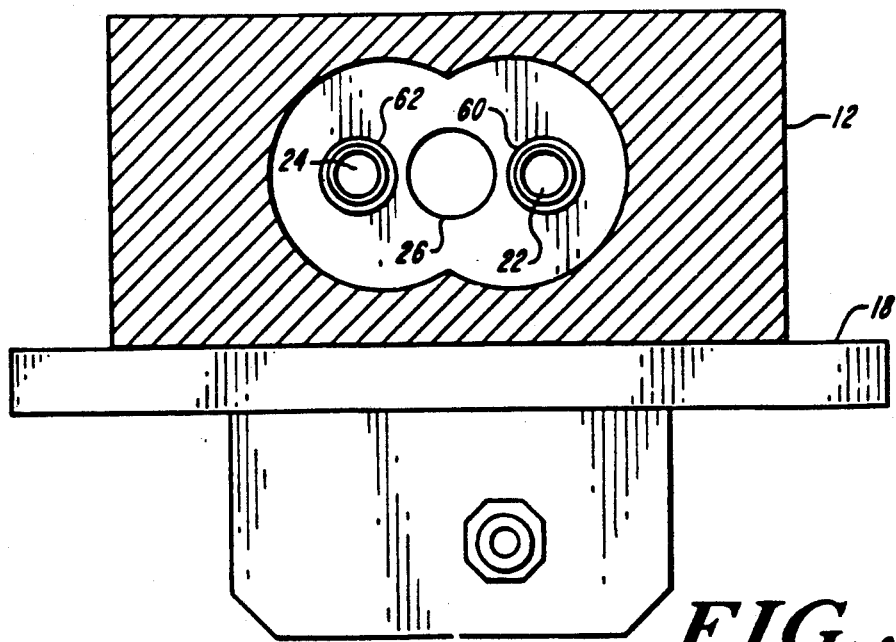
FIG. 3 is a sectional view taken through the plane indicated at 3—3 of FIG. 1.

Referring to FIG. 3 the cross section of the pump cavity in block 12 is shown defining a double ellipse having a common focus. The NdYAG rod 26 is supported by end plates 14 and 16 with its longitudinal centerline coincident with the common focus. Flash lamps 24 and 22 are supported by end plates 14 and 16 with their longitudinal centerlines parallel with respectively the left and right extreme foci. This arrangement places the NdYAG rod at the location within the cavity receiving the greatest concentration of reflected and directly transmitted radiant energy produced by the flash lamps. Flow tubes 60 and 62 are composed of a highly transmissive glass coated with samarium and sensitizer ions to absorb unwanted ultraviolet and infrared radiation while transmitting nearly 97% of light in the spectrum including wavelengths of the NdYAG pump bands. The interior surfaces of the cavity have a thin gold coating which is highly reflective of light at the wave lengths of interest for pumping the NdYAG laser rod. The gold coating is applied over a nickel plating which has been "color buffed" to provide a smooth substrate surface for the gold coating while at the same time acting as a barrier against migration of the gold into the copper block. The double ellipse defines paths for all the light passed by the flow tubes 60 and 62 to the common focus of the cavity. The overall operating efficiency of the laser cavity with the samarium coated flow tubes is in the range of 4 to 4.5%. This increased operating efficiency, compared to known NdYAG lasers, permits high average power operation with less input power. Consequently, the flash lamps can be operated at lower power levels thereby extending their operating life.

Figure 5:
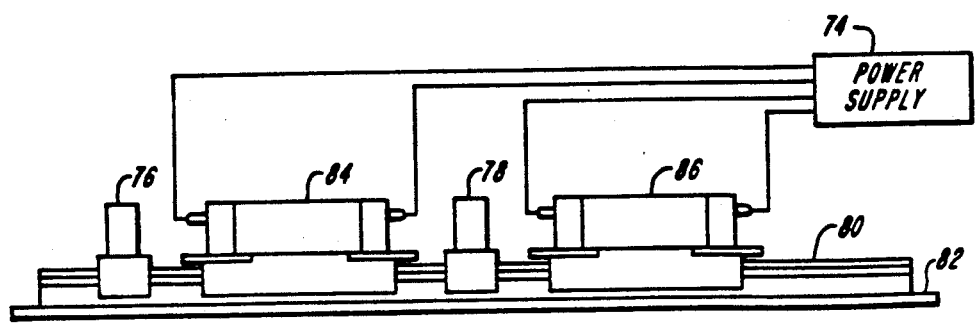
FIG. 5 is a side view of a laser system employing the laser head of the present invention.

In FIG. 5 a laser system is shown employing two laser amplifiers 84 and 86 as described. To create a laser oscillator, a single laser amplifier 84 is disposed between a nearly perfectly reflecting rear mirror 76 and an output window 78 which is partially reflective of the laser radiation. The rear mirror 76 and output window 78 provide optical feedback through the NdYAG rod of amplifier 84. The output beam from the output window 78 is input to the NdYAG rod of the following laser amplifier 86. The amplifiers 84 and 86, the rear mirror 76, and output window 78 are all mounted on an optical rail or bench 80 supported by a base plate 82. The optical rail 80 provides a suitable support for mounting and alignment of the laser amplifiers 84 and 86, rear mirror 76 and output window 78. It is to be understood that one or more laser amplifiers may be mounted to follow the laser oscillator. Further, it will be appreciated that by use of beam directing mirrors or prisms the laser amplifiers beyond the output window 78 need not be mounted on the same rail as the laser amplifier used in the laser oscillator. Power for pulsing the flash lamps of the laser amplifiers 84 and 86 is provided by a power supply 74. Inputs to the power supply 74 determine the pulse width, repetition rate, and energy level of pulses to be applied to the laser flash lamps. Applicant has chosen to use a current regulating power supply to further control the energy input to the flash lamps during each pulse. The output laser radiation of amplifier 86 is transmitted through shutters, beam pipes, fiber optics and focusing elements as needed to direct the energy of the beam to a work point.

With a NdYAG rod measuring 10 millimeters in diameter and 150 millimeters in length and being doped with a neodymium concentration of 1.1%, and using krypton gas discharge flash lamps, applicant has achieved average power of the output beam of the laser amplifier of 500 watts with an input power of 13 kilowatts. Average power in pulsed operation is computed as the product of the pulse repetition rate and energy per pulse. A 1 kilowatt laser system requires two 500 watt laser amplifiers, one used in the laser oscillator and one following. In operation the 1000 watt NdYAG laser system has an operating cost, including the cost of replacement of flash lamps, about equal to that of a $CO_2$ laser of 1500 watt rating. The 1000 watt NdYAG laser system is capable of cutting and welding metals at greater thicknesses than the 1500 watt $CO_2$ laser and requires no warm-up time prior to its productive use. By addition of further NdYAG amplifiers increased operating powers to about 2 kilowatts average may be obtained while maintaining the advantages of reduced volume and improved energy coupling as compared to the $CO_2$ laser.

Cuts with a 1 kilowatt system of 0.5 inch thick copper have been achieved with the following parameters and results:

| Pulse Width | Pulse Repetition Rate | Energy Per Pulse | Cut-Speed |
|---|---|---|---|
| 3.7 millisec | 13.5 pulses/sec. | 60 joules | 0.3 inches/minute |

Cuts of 304 stainless steel 1.5 millimeters thick and titanium 2 millimeters thick have been achieved without discoloration of the cut edges with the following parameters and results:

| Material | Pulse Width | Pulse Repetition Rate | Energy Per Pulse | Cut Speed |
|---|---|---|---|---|
| 304SS | 0.5 msec | 200 pulses/sec | 3.5 joules | 60 in/min |
| Titanium | 0.5 msec | 200 pulses/sec | 3.5 joules | 30 in/min |

Other metal cutting tests have been performed with the 1 kilowatt laser system as summarized below.

| Material | Thickness | Pulse Width | Rep. Rate | Energy/Pulse | Cut Speed |
|---|---|---|---|---|---|
| Aluminum | 0.5 in. | 3.7 msec | 13.5/sec. | 60 joules | 1 in/min |
| Aluminum | 0.25 in. | 2.0 msec | 25/sec | 32 joules | 10 in/min |
| Aluminum | 0.06 in. | 0.5 msec | 100/sec. | 8 joules | 70 in/min |
| Steel Stainless | 0.5 in. | 2.5 msec | 20/sec. | 40 joules | 4 in/min |
| Cold Rolled | 0.028 in. | 0.5 msec | 300/sec. | 2 joules | 200 in/min |

The arrangement of flash lamps and samarium coated flow tubes of the invention have the additional advantage that in the event of breakage of a flash lamp, the thin gold coating of the laser cavity is protected against scratching by the samarium coated flow tube. In general, replacement of flash lamps is readily accomplished without the need for disassembly of the laser amplifier beyond removal of the seal plates retaining the lamps to be replaced.

While the preferred embodiment has been described in considerable detail, it is not the intention of applicants to limit the scope of the invention to such details. Alternative designs for individual components may readily be substituted without deviating from the intended spirit of the invention. It is intended to cover all modifications, alterations and equivalents falling within the spirit and scope of the appended claims.

What is claimed is:

1. In a method for cutting metals using a laser, the improvement comprising generating a pulsed beam of laser radiation having a wavelength of 1.06 microns, a pulse width of from about 0.2 milliseconds to about 4 milliseconds, a pulse repetition rate of from about 10 pulses per second to about 400 pulses per second, an energy per pulse of from about 2 joules to about 70 joules such that the product of pulse repetition rate and energy per pulse is from about 50 watts to about 800 watts.

2. The method of claim 1 wherein the metal to be cut is copper and has a thickness at the point to be cut of about 0.5 inches.

3. The method of claim 1 wherein the metal to be cut is titanium having a thickness of about 2 millimeters where cutting is to occur and the cut is made without discoloration of the metal at the edges adjacent the cut.

* * * * *